L. PATTON.
INSECT CATCHER.
APPLICATION FILED DEC. 8, 1919.
1,338,587.
Patented Apr. 27, 1920.
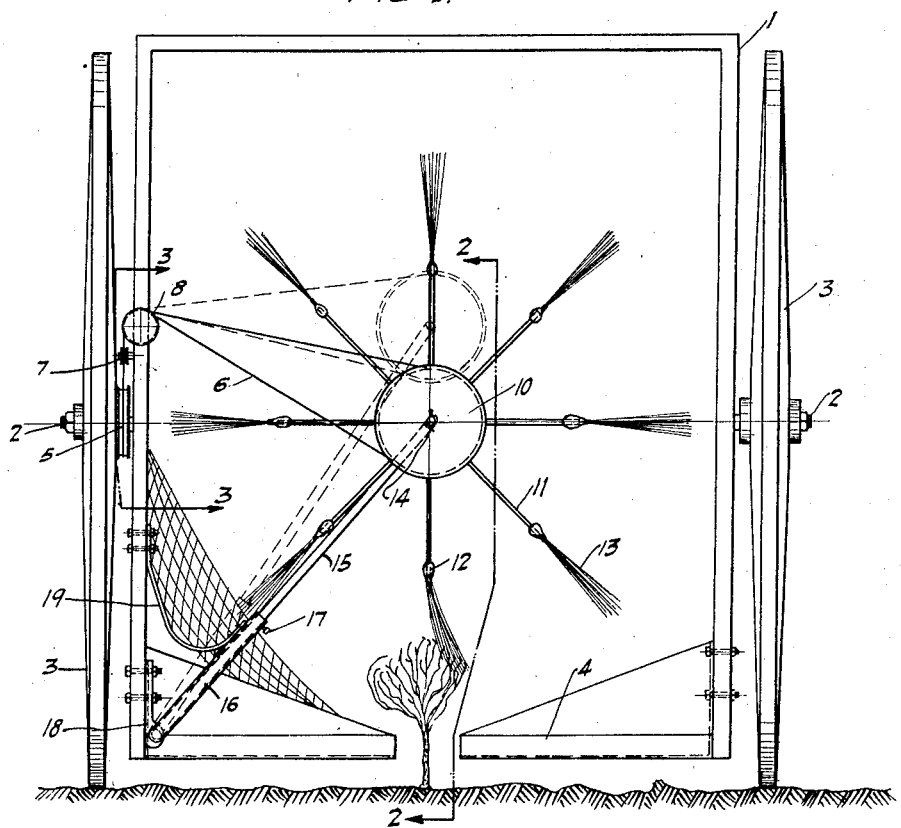
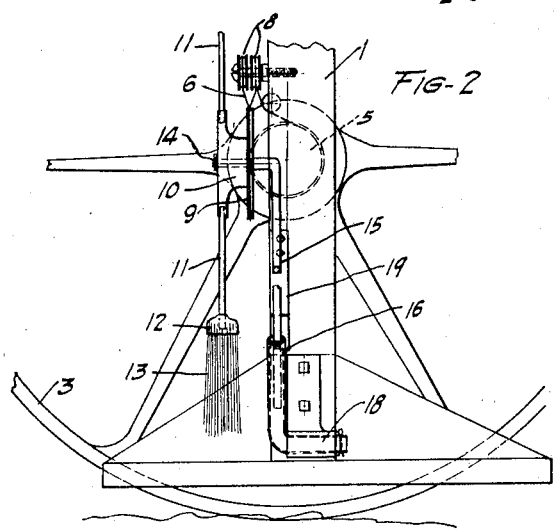
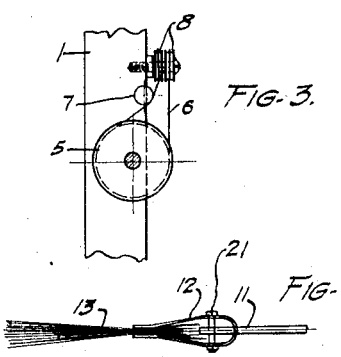
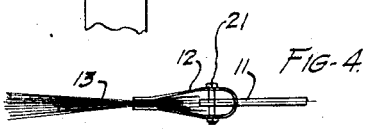
INVENTOR
LUTHER PATTON
BY
ATTORNEY

UNITED STATES PATENT OFFICE.

LUTHER PATTON, OF WEST BLOCTON, ALABAMA.

INSECT-CATCHER.

1,338,587.  Specification of Letters Patent.  Patented Apr. 27, 1920.

Application filed December 8, 1919. Serial No. 343,350.

*To all whom it may concern:*

Be it known that I, LUTHER PATTON, a citizen of the United States of America, residing at West Blocton, in the county of Bibb and State of Alabama, have invented certain new and useful Improvements in Insect-Catchers, of which the following is a specification.

My invention relates to an improved machine for catching insects and particularly boll weevils, potato bugs, and like plant injuring insects which must be dislodged from the plant in order to destroy them.

The object of my invention is to design an insect catcher having a novel type of rotary brush wheel adjustably mounted therein and adapted to strike and gently agitate the plants with its brushes in the manner most effective for shaking off the insects into catching pans and which at the same time will not injure the plants.

A further object is to provide brushes for the brush wheel which are capable of ready replacement in the field and which are simple and inexpensive in their construction.

More particularly my invention includes the novel details in construction and arrangements of parts, which in their preferred embodiment only are illustrated in the accompanying drawings, in which:—

Figure 1 is a front elevation of my improved machine, the dotted lines showing the beater at a higher working level.

Fig. 2 is a sectional view taken on the line 2—2 of Fig. 1 showing the supporting rigging for the beater and the beater brushes in elevation.

Fig. 3 is a detail view of the driving and idler pulley rigging for the brush driving.

Fig. 4 is a detail view of the brush and its holder or clamp.

Similar reference numerals refer to similar parts throughout the drawings.

I have shown my invention as applied to a boll weevil catching machine of the general type described and claimed in detail in my Letters Patent No. 1,289,250, issued Dec. 31st, 1918, and which comprises an upright inverted U-shaped frame 1 having wheel axles 2 at each side on which are mounted a pair of supporting wheels 3. At its lower end, the frame carries trays 4, spaced for plants to pass between them and disposed so as to travel under the plant limbs as the machine is drawn lengthwise of and centrally over a row of plants to be treated. To one wheel hub I attach a pulley 5 and about this I pass a flexible belt or driving connection 6 which then passes over guide pulleys 7 and 8 mounted above pulley 5 on one side of the frame and thence passes around the pulley 9 mounted fast on the axle or hub 10 of the brush wheel. This brush wheel is formed by a series of radial spokes 11 made fast to the inner hub 10 and having attached to the outer end of each a brush holder 12. This brush holder is made of substantial width and is adapted to hold a thin brush 13 formed of broom straw or equivalent material which is mounted in the holder and clamped therein in any suitable manner. The brush and pulley 9 turn on a shaft 14 formed by the rounded angled end of a square rod 15, which at its other end is telescoped into a pipe 16 and held against rotation at the desired adjustment by a set screw 17. The pipe 16 at its lower end is bent at right angles and journaled in a bearing bracket 18 made fast to the frame and a flat spring 19 also attached to the frame, is adapted to engage this pipe arm 16 and press it so as to maintain the tension on the belt 6 sufficient to hold it to its work. The rod 15 can be adjusted lengthwise in the pipe 16 to give the brush wheel the required height according to the plants being treated. The shaft 14 is bent outwardly in the opposite direction to the lower bearing end of the pipe 16, this arrangement bringing the brush wheel in position to clear the frame and thus avoid the brushes engaging the frame when adjusted to their maximum height. The brush wheel is spaced from the pulley 9 sufficiently for the wide brushes to clear the driving belt 6.

If desired an apron 20 of canvas or the like, shown only in Fig. 1, can be mounted on the side of the frame toward which the brushes tend to knock the insects. The pulleys 8 are mounted for independent rotation on any suitable bearing pin on the frame and may be arranged in any convenient manner for guiding the belt to the brush pulley throughout the adjustments of the latter.

The rod 15 being square will be held by its set screw 17 against turning in the pipe. The brush holder 12 is preferably formed by a bent plate slotted in the bend to receive the spoke 11 and having opposite holes for a bolt 21 which serves both to secure the holder to the spoke and to clamp the free ends of the holder against the brush.

In operation, as the machine passes over a row of plants to be treated, its wheel will drive the belt 6 and rotate the brush wheel which turns on an axis parallel with and disposed above the row, causing its brushes 13 to gently strike and shake the plant limbs so as to dislodge the insects thereon and cause them to fall into the pans 4 from which they can be collected and destroyed. In adjusting the brush wheel to operate on plants of varying heights, the telescoping members 15 and 16, permit of the necessary vertical adjusting of the brush wheel while the spring 19 holds proper tension on the belt throughout adjustments of pulley 9 with the brush wheel.

My invention may be widely varied in its detailed construction without departing from its essential principles.

What I claim is:—

1. An insect catcher of the character described, comprising a wheel supported frame, a belt driven by one of said wheels, a brush holding wheel driven by the belt, a telescoping adjustable support for the brush wheel, and spring means acting on said support to maintain tension on the belt.

2. In an insect catcher, a wheel supported frame, a pulley driven by a wheel, an idle pulley means near the top of the frame, a rotary brush within the frame having a pulley, an endless belt passing over said several pulleys, a supporting frame for the brush wheel comprising telescoping adjustable arms hinged near the base of the frame, and a spring means attached to the frame and engaging said brush wheel supporting frame at its lower end to maintain tension on said endless belt, substantially as described.

3. In an insect catcher, a frame, a longitudinally extensible support hinged near the base of the frame at one side, a bearing carried by said support, a hub rotatable on the free end of said support, a spring to press the bearing away from said frame, a series of radial arms on said hub, a wide brush socket on each arm, a brush in each socket, and wheel driven means to rotate the brushes free of interference with the adjustments of said support.

In testimony whereof I affix my signature.

LUTHER PATTON.

Witness:
   NOMIE WELSH.